United States Patent
Noponen et al.

(10) Patent No.: US 9,673,463 B2
(45) Date of Patent: Jun. 6, 2017

(54) CONTROL ARRANGEMENT AND METHOD IN FUEL CELL SYSTEM

(71) Applicant: CONVION OY, Espoo (FI)

(72) Inventors: Matti Noponen, Espoo (FI); Kim Åström, Kirkkonummi (FI)

(73) Assignee: CONVION OY, Espoo (FI)

( * ) Notice: Subject to any disclaimer, the term of this patent is extended or adjusted under 35 U.S.C. 154(b) by 978 days.

(21) Appl. No.: 13/715,102

(22) Filed: Dec. 14, 2012

(65) Prior Publication Data

US 2015/0357662 A1 Dec. 10, 2015
US 2016/0248108 A2 Aug. 25, 2016

Related U.S. Application Data

(63) Continuation of application No. PCT/FI2011/050316, filed on Apr. 12, 2011.

(30) Foreign Application Priority Data

Jun. 16, 2010 (FI) .................................. 20105697

(51) Int. Cl.
*H01M 8/04746* (2016.01)
*H01M 8/04082* (2016.01)
(Continued)

(52) U.S. Cl.
CPC ..... *H01M 8/04746* (2013.01); *H01M 8/0438* (2013.01); *H01M 8/04097* (2013.01);
(Continued)

(58) Field of Classification Search
CPC ......... H01M 8/04097; H01M 8/04388; H01M 8/04447; H01M 8/04992; H01M 8/0438;
(Continued)

(56) References Cited

U.S. PATENT DOCUMENTS

2007/0009772 A1 1/2007 Iio
2009/0110989 A1 4/2009 Daly et al.
(Continued)

FOREIGN PATENT DOCUMENTS

DE 20 2005 016154 U1 1/2006
FI 20086029 * 1/2010
WO WO 2010/004083 A1 1/2010

OTHER PUBLICATIONS

Notificatio to Grant Apr. 9, 2015 MT.*
(Continued)

*Primary Examiner* — Patrick Ryan
*Assistant Examiner* — Alex Usyatinsky
(74) *Attorney, Agent, or Firm* — Buchanan Ingersoll & Rooney PC

(57) ABSTRACT

A control arrangement in a fuel cell system for producing electricity with fuel cells, the fuel cell system including means for recirculating fuel through the anode sides of the fuel cells, and at least one system controller in a control processor for controlling the operation of the fuel cell system. The control arrangement includes means for performing a substantially asynchronous chemical reaction rates calculation process of at least one of fuel composition and fuel flow rate to accomplish information in a substantially iterative process on at least recirculation ratio of the fuel recirculation through anodes and means for generating, in a substantially synchronous process with the system controller process, fuel utilization (FU) information and Carbon formation information by utilizing the latest available recirculation ratio information provided by said asynchronous process.

24 Claims, 3 Drawing Sheets

(51) Int. Cl.
*H01M 8/0438* (2016.01)
*H01M 8/04089* (2016.01)
*H01M 8/0444* (2016.01)
*H01M 8/04992* (2016.01)
*H01M 8/0612* (2016.01)
*H01M 8/124* (2016.01)

(52) U.S. Cl.
CPC ... *H01M 8/04201* (2013.01); *H01M 8/04388* (2013.01); *H01M 8/04447* (2013.01); *H01M 8/04992* (2013.01); *H01M 8/0612* (2013.01); *H01M 2008/1293* (2013.01); *Y02E 60/50* (2013.01); *Y02E 60/525* (2013.01)

(58) Field of Classification Search
CPC ......... H01M 8/04746; H01M 8/04201; H01M 8/0612; H01M 2008/1293; Y02E 60/50; Y02E 60/525
See application file for complete search history.

(56) References Cited

U.S. PATENT DOCUMENTS

| 2009/0208789 A1 | 8/2009 | Janarthanam et al. |
| 2009/0280373 A1 | 11/2009 | Baaser et al. |
| 2011/0165486 A1 | 7/2011 | Hottinen et al. |

OTHER PUBLICATIONS

Notificatio to Grant Apr. 9, 2015 Orig.*
International Search Report (PCT/ISA/210) issued on Sep. 9, 2011, by the Finnish Patent Office as the International Searching Authority for International Application No. PCT/FI2011/050316.
International Preliminary Report on Patentability (PCT/IPEA/409) issued on Sep. 26, 2012, by the Finnish Patent Office as the International Searching Authority for International Application No. PCT/FI2011/050316.
Search Report issued on Mar. 11, 2011, by the Finnish Patent Office for Application No. 20105697.

* cited by examiner

CONTROL ARRANGEMENT AND METHOD IN FUEL CELL SYSTEM

RELATED APPLICATIONS

This application claims priority as a continuation application under 35 U.S.C. §120 to PCT/FI2011/050316, which was filed as an International Application on Apr. 12, 2011 designating the U.S., and which claims priority to Finnish Application No. 20105697 filed in Finland on Jun. 16, 2010. The entire contents of these applications are hereby incorporated by reference in their entireties.

FIELD

Fuel cells are electrochemical devices supplied with reactants for producing electrical energy.

BACKGROUND INFORMATION

Fuel cells are electrochemical devices which can be used to produce electrical energy with high efficiency and in an environmentally friendly manner. Fuel cell technology is considered one of the most promising future forms of energy production.

FIG. 1 shows a fuel cell comprising an anode side 100 and a cathode side 102 and an electrolyte 104 between them. The reactants fed to the fuel cell devices undergo a process in which electrical energy and water are produced as a result of an exothermal reaction. In solid oxide fuel cells (SOFCs), oxygen 106 fed to the cathode side receives an electron from the cathode, that is, is reduced to a negative oxygen ion which travels through the electrolyte to the anode where it combines with the fuel 108 used, producing water and carbon dioxide. Between the anode 100 and the cathode 102 is a separate passage, that is, an external electric circuit 111 through which electrons e—(i.e., an electric current) travel through the load 110 to the cathode.

FIG. 2 shows a SOFC (solid oxide fuel cell) device, which may utilize, for example, natural gas, biogas or methanol or other compounds containing hydrocarbons, as its fuel. The fuel cell device arrangement shown in FIG. 2 comprises plate-like fuel cells, each fuel cell comprising an anode 100 and a cathode 102 as show in FIG. 1, and in FIG. 2 the fuel cells are assembled in stack formation 103 (SOFC stack). The fuel is recirculated in feedback arrangement through the anode sides of the fuel cells.

The fuel cell device arrangement shown in FIG. 2 comprises a fuel heat exchanger 105 and a reformer 107. Heat exchangers are used for controlling the heat balance of the fuel cell process and there may be several of them at different locations in the fuel cell device. The excess heat energy in the recirculated gas is recovered in the heat exchanger for use elsewhere in the fuel cell device or in the district heating network. The heat exchanger recovering the heat may thus be at a different location than that shown in FIG. 2. The reformer is a device which converts fuel, such as natural gas, into a form suitable for fuel cells, that is, for example, into a gas mixture containing one half of hydrogen and the rest methane, carbon dioxide and inert gases. The reformer is not, however, necessary in all fuel cell implementations; untreated fuel may also be fed directly to the fuel cells 103.

Only a part of the fuel burned on the fuel cell 103 anodes 100 is recirculated through the anodes in a feedback arrangement and FIG. 2, therefore, shows diagrammatically the exhaustion 114 of the remainder of the fuel from the anodes 100. By using measurement means 112 (such as, for example, fuel flow meter, current meter and temperature meter), measurements can be carried out for the operation of the SOFC device from the through anode recirculating gas. Control processor 116 is closely related to a reciprocal co-operation with the measurement means 112.

Natural gases such as methane and gases containing higher carbon compounds can be used as fuels in SOFCs. It can be desirable to preprocess such gases before feeding to the fuel cells to prevent carbon formation, i.e., coking. In coking, hydrocarbons decompose thermally and produce carbon which adheres to the surfaces of the fuel cell device and adsorbs on catalysts, such as nickel particles. The carbon produced in coking coats some of the active surface of the fuel cell device, thus significantly deteriorating the reactivity of the fuel cell process. The carbon may even completely block the fuel passage.

Preventing coking can be desirable for ensuring a long service life for the fuel cells. The prevention of coking can also save catalysts, that is, the substances (nickel, platinum, etc.) used in fuel cells for accelerating reactions. Gas preprocessing can require water, which is supplied to the fuel cell device. The water produced in combining the oxygen ion and the fuel, that is, the gas on the anode may also be used in the preprocessing of the gas.

In comparative preprocessing, it can be desirable or necessary to know the composition of the gas recirculated through the anode in feedback arrangement with sufficient accuracy for the preprocessing of the gas to be successful. For example, it can be desirable or necessary to control the oxygen/carbon (O/C) ratio, and to some extent also the hydrogen/carbon (H/C) ratio, to avoid the riskiest reaction environment for carbon formation.

In non-dead-end operated fuel cell systems, the fuel utilization (FU) can be a significant controllable parameter affecting system performance and lifetime. Additionally, in systems involving reforming of hydrocarbon fuels, it can be desirable to keep the system conditions of certain fuel streams sufficient to minimize the risk of carbon formation within the system. A means of minimizing carbon formation is to control oxygen-to-carbon ratio (OC-ratio), hydrogen-to-carbon ratio (HC-ratio) and system temperatures, which all together define the probability for carbon formation in the system. A means to maintain a sufficient OC-ratio and HC-ratio include anode exhaust gas recirculation, fuel reforming by partial oxidation and auxiliary water feed.

As both fuel utilization (FU) information and carbon formation information are cumbersome to determine by means of in-line measurements, they can be determined computationally. In systems where the fuel composition is dependent solely on the inlet streams to the system, calculation of the FU information and carbon formation information is rather straight-forward. However, in systems involving anode recirculation, the FU information and carbon formation information become dependent on the mass flow and composition in the recirculation loop as part of the depleted fuel leaving the fuel cell anodes is returned back to the anode inlet streams. If the system involves anode outward leakage or cross-over leakage from anode to cathode side, which can be the case for many types of high temperature fuel cells, the anode outlet composition, i.e., composition being recirculated, cannot be determined without knowing the recirculation flow and a couple of composition characteristics.

For any given recirculation ratio, i.e., fraction of anode outlet gas being recirculated back to the inlet streams, the atomic flows within the anode circulation loop can be calculated analytically through direct substitution. The molar fractions of the actual gas constituents can be based on the atomic fractions being solved for a given condition. Assuming that the anode outlet composition in the presence of anode catalysts at a high temperature, reaches the corresponding thermal equilibrium composition, the anode outlet composition can hence be solved for said given recirculation ratio. The solving of the thermal equilibrium composition can require the determination of a steam reforming reaction rate satisfying a fourth-grade polynomial, whose coefficients are a function of temperature and the said atomic fractions. If the fuel composition does not reach equilibrium, fuel composition can be determined from kinetic models. Having determined the anode outlet composition, the actual flow in the anode recirculation loop can be calculated using characteristic curves for the anode circulation means (for example pump or ejector), or based on a flow measurement of the circulation flow. This, in turn yields the recirculation ratio for the particular anode outlet composition. If this recirculation ratio equals (by a reasonable margin) the original recirculation ratio used to determine the said composition, a valid solution for the recirculation loop flows and hence FU information and carbon formation information have been found. Otherwise, the calculation is repeated modifying the initial value for the recirculation until a valid solution is found.

The described method for determining the fuel flow compositions involves iteration with multiple nested iteration steps. All together, the finding of a valid solution for recirculation ratio and hence for FU information and carbon formation information may, depending on the system conditions and initial values, involve a considerable amount of floating-point arithmetic operations. In systems with limited computation capacity such as industrial control hardware, the described iteration process may require several seconds to complete. Hence, including the calculation in the cyclic task loop of a fuel cell control system can hamper the overall execution time of the control cycle.

Due to the computation intensity of the described method for accurate determination of fuel compositions, solutions have used simplifying means to reduce the computation need, however sacrificing accuracy and/or versatility. PCT/FI2009/050503 discloses a method where interpolation from a look-up table, with pre-calculated solutions for pre-defined combinations of fuel cell currents, temperatures and flows is used to avoid the need for real-time calculation in determination of recirculation ratio, FU ratio and OC ratio. Although significantly less calculation intensive, the applicability of the method is limited to the pre-defined parameter ranges with a highly limited number of parameters that can be varied in order to keep the size of the look-up table reasonable. For example, in biogas applications where the variable composition of the inlet fuel introduces additional degrees of freedom to the flow conditions within the system, the solution described in PCT/FI2009/050503 can have significant shortcomings.

SUMMARY

According to an exemplary aspect, disclosed is a fuel cell system for producing electricity with fuel cells comprising a control arrangement, each fuel cell in the fuel cell system comprising an anode side, a cathode side and an electrolyte between the anode side and the cathode side, and the fuel cell system comprises means for recirculating fuel through the anode sides of the fuel cells, and the control arrangement comprises at least one system controller in a control processor for controlling the operation of the fuel cell system in control cycles of the system controller control process, wherein the control arrangement comprises: means for performing an asynchronous chemical reaction rates calculation process of at least one of fuel composition and fuel flow rate asynchronically with the control cycles of the system controller control process to generate information in an iterative process on at least recirculation ratio of the fuel recirculation through anodes, means for generating, in a synchronous process synchronically with the control cycles of the system controller control process, fuel utilization (FU) information and carbon formation information by utilizing the latest available recirculation ratio information provided by said asynchronous process, and means for performing an active cyclic system control and system monitoring process by utilizing said FU information and carbon formation information, wherein the control arrangement comprises said means for performing an asynchronous chemical reaction rates calculation process, said means for generating fuel utilization (FU) information and carbon formation information, and said means for performing an active cyclic system control and system monitoring process, as integrated to the same control processor, wherein said means for performing an asynchronous chemical reaction rates calculation process is adapted to process the asynchronous process simultaneously with the synchronous process so that said active cyclic system control and system monitoring process is processed below maximum allowed execution interval.

According to an exemplary aspect, disclosed is a control method for a fuel cell system for producing electricity with fuel cells, in which method fuel is recirculated through the anode sides of the fuel cells, and operation of the fuel cell system is controlled in control cycles of a system control process, wherein the method comprises: processing an asynchronous chemical reaction rates calculation process of at least one of fuel composition and fuel flow rate asynchronically with the control cycles of the system control process to generate information in an iterative process on at least recirculation ratio of the fuel recirculation through anodes, generating fuel utilization (FU) information and carbon formation information in a synchronous process synchronically with the control cycles of the system control process by utilizing the latest available recirculation ratio information provided by said asynchronous process, performing an active cyclic system control and system monitoring process by utilizing said FU information and carbon formation information, wherein in the method, the performance of the asynchronous and the synchronous method steps and the performance of the active cyclic system control and system monitoring process are integrated to be performed in a same control processor, and processing the asynchronous process simultaneously with the synchronous process so that said active cyclic system control and system monitoring process is processed below maximum allowed execution interval.

DETAILED DESCRIPTION

Figure 1:
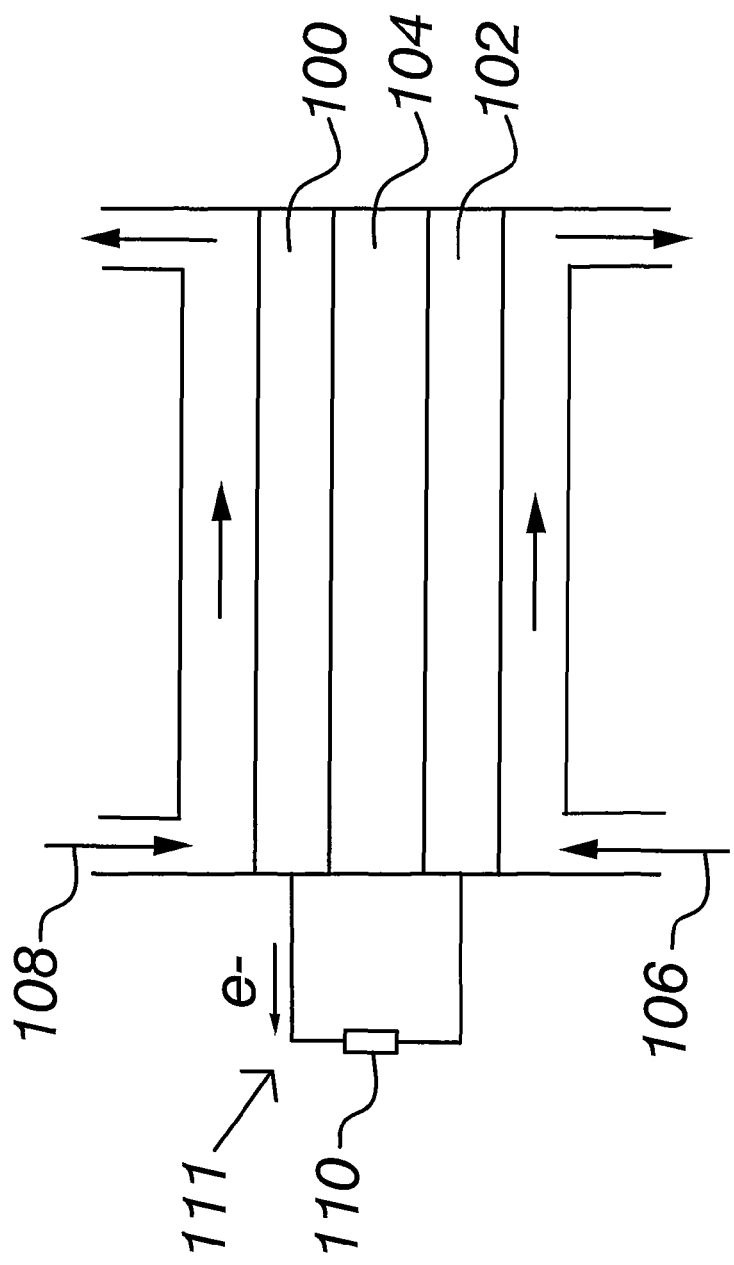
FIG. 1 shows a structure of a single fuel cell, according to an exemplary aspect.

According to an exemplary aspect, disclosed is a control of fuel cell system, which operates in a reliable manner with minimum processor capacity and is able to react also to fast changes in fuel cell system operating conditions. This can be achieved by a control arrangement in a fuel cell system for producing electricity with fuel cells, each fuel cell in the fuel cell system comprising an anode side, a cathode side and an electrolyte between the anode side and the cathode side, and the fuel cell system comprising means for recirculating fuel through the anode sides of the fuel cells, and at least one system controller in a control processor for controlling the operation of the fuel cell system. The control arrangement comprises means for performing a substantially asynchronous chemical reaction rates calculation process of at least one of fuel composition and fuel flow rate to accomplish information in a substantially iterative process on at least recirculation ratio of the fuel recirculation through anodes, means for generating, in a substantially synchronous process with a system controller process, fuel utilization (FU) information and Carbon formation information by utilizing the latest available recirculation ratio information, means for performing an active cyclic system control and system monitoring process by utilizing said FU information and Carbon formation information, and said means for processing the asynchronous process substantially simultaneously with the synchronous process so that said active cyclic system control and system monitoring process is processed below maximum allowed execution interval.

According to an exemplary aspect, disclosed is a control method for a fuel cell system to produce electricity with fuel cells. In such method, fuel is recirculated through the anode sides of the fuel cells. The method includes processing a substantially asynchronous chemical reaction rates calculation process of at least one of fuel composition and fuel flow rate to accomplish information in a substantially iterative process on at least recirculation ratio of the fuel recirculation through anodes; generating fuel utilization (FU) information and Carbon formation information in a substantially synchronous process with the system control process by utilizing the latest available recirculation ratio information; performing an active cyclic system control and system monitoring process by utilizing said FU information and Carbon formation information; and processing the asynchronous process substantially simultaneously with the synchronous process so that said active cyclic system control and system monitoring process is processed below maximum allowed execution interval.

An exemplary aspect is based on performing a substantially asynchronous, as compared to the operation of the system controller, chemical reaction rates calculation process of at least one of fuel composition and fuel flow rate to accomplish information in a substantially iterative process on at least recirculation ratio, which recirculation ratio information is utilized in a substantially synchronous process, as compared to the system controller process, to generate fuel utilization (FU) information and Carbon formation information. An active cyclic system control and system monitoring process utilize said FU information and Carbon formation information. An exemplary aspect is based on that the asynchronous process is processed substantially simultaneously with the synchronous process so that maximum allowed execution interval of the active cyclic system control and monitoring process is not exceeded.

For example, provided are very good run-time configurability and capability to handle variations in operating conditions, such as, for example, inlet fuel gas composition variations in gas applications, without a need of an auxiliary computation processor capacity for performing time consuming reaction equilibrium calculations. An exemplary embodiment also allows for excellent transient response of system control.

An exemplary embodiment can have the advantage that no predefined window of operation or fixed set of parameters for the equilibrium calculation needs to be defined as the actual calculation is carried out real-time in parallel with control algorithms using the same computer processor capacity.

As a recirculation flow of the fuel cell device can depend on the composition being recirculated, the solving of anode compositions can become an iterative process. An exemplary method includes generating accurate real-time feedback information of anode fuel composition for control purposes in fuel cell systems employing anode fuel recirculation, without a need for auxiliary computation processor capacity for performing time consuming reaction equilibrium calculations. The used fuel can be gas or gaseous, and this is why instead of using the term "fuel", the term "gas" can also be used. The method can involve a calculation and feedback generation methodology in which the calculation is split in two processes; a calculation intensive iterative part for iterative solving of thermodynamic equilibrium reaction rates of chemical reactions in anode fuel recirculation and recirculation ratio, and a secondary less calculation intensive part for providing primary feedback information for system controllers. The calculation intensive part is implemented as a substantially asynchronous parallel process to system control whereas the feedback generation part is executed synchronously to system control. Instead of thermodynamic equilibriums according to thermodynamic models, calculation of the calculation intensive part can also be based on kinetic models of fuel atoms and molecules in anode fuel recirculation. Also this calculation can be iterative in its nature.

An exemplary embodiment allows using an iteration algorithm to generate real time FU (Fuel Utilization) feedback information and carbon formation information, i.e., minimum allowed OC-ratio (Oxygen-to-Carbon-ratio) with sufficient margin at given hydrogen-to-carbon-ratio, nitrogen-to-carbon-ratio and temperature. Said feedback information can be utilized in control of systems with limited computation capability as part of a cyclic execution scheme without the need for auxiliary computation processor(s). An exemplary method allows for dividing the reaction rates calculation duty over several control execution cycles while still providing an updated FU- and OC-feedback signal for the control on each control cycle (e.g., once every 100 ms), allowing for rapid control. This can be based on utilization of the following means: the iterative algorithm can be converted from nested while-loop type to a state-flow type representation suitable for cyclic execution (i.e., only a limited amount of operations is executed on a single cycle). The control software can be arranged such that all computation time left after control and housekeeping operations is used for the reaction rates calculation algorithm. For example, the reaction rates calculation is executed as an asynchronous parallel process although formulated and executed as part of a control-synchronous cyclic execution scheme. Atomic fuel flows and hence the FU- and OC-values relevant for control can be recalculated for each control cycle based on the most recent RR (Recirculation Ratio) retrieved by the reaction rates calculation.

Since in an exemplary embodiment, FU value and OC value can be recalculated on each control cycle despite of the fact that the actual solving of the reaction rates calculation (and hence RR) may take significantly longer, this can allow for immediate feedback response on changes in operating parameters (input flows, compositions, fuel cell load). The changes in input parameters can also affect the actual recycling ratio, for example, whereby the FU and OC values calculated based on an old RR are not fully accurate. Despite this potential lack of preciseness in the immediate response, the changes in input parameters can affect the FU and OC in the right direction allowing for control response in the right direction in a closed-loop control system. For the stability of closed loop control it can be of importance that the feedback delay between control action and feedback response is as short as possible and does not vary. This can be achieved by minimizing the feedback delay so that controllers are allowed to take immediate action on sudden changes in operating parameters, and this can allow for over all fast response in related control loops. Hence, in an exemplary embodiment, the variable and longer delay in the solving of RR does not, to a remarkable extent, compromise the transient response capability, because the primary response in FU and OC is immediate.

Fast and stable control response can make the system highly robust towards sudden internally or externally induced changes, such as, for example, gas composition or pressure fluctuations from a biogas source. Following a sudden change in conditions, the RR corresponding to the new conditions can be updated once the reaction rates calculation has converged. The consequent delayed response in RR can in turn have an effect on FU and OC, whereby closed-loop controllers can fine-tune their outputs such that the controllable parameters can accurately meet their set points as the transient situation is over.

According to an exemplary embodiment, an advantage can be attained that no predefined window of operation or fixed set of parameters for the reaction rates calculation needs to be defined as the actual calculation is carried out real-time in parallel with control algorithms using the same computation hardware. All parameters affecting the calculation can be changed real-time whereby closed-loop control logic can react correspondingly. An exemplary embodiment can be beneficial in variable fuel composition applications, such as, for example, biogas applications. The optimized response characteristic can make it suited for applications requiring fast response capability to, for example, sudden changes in fuel cell load.

Figure 3:
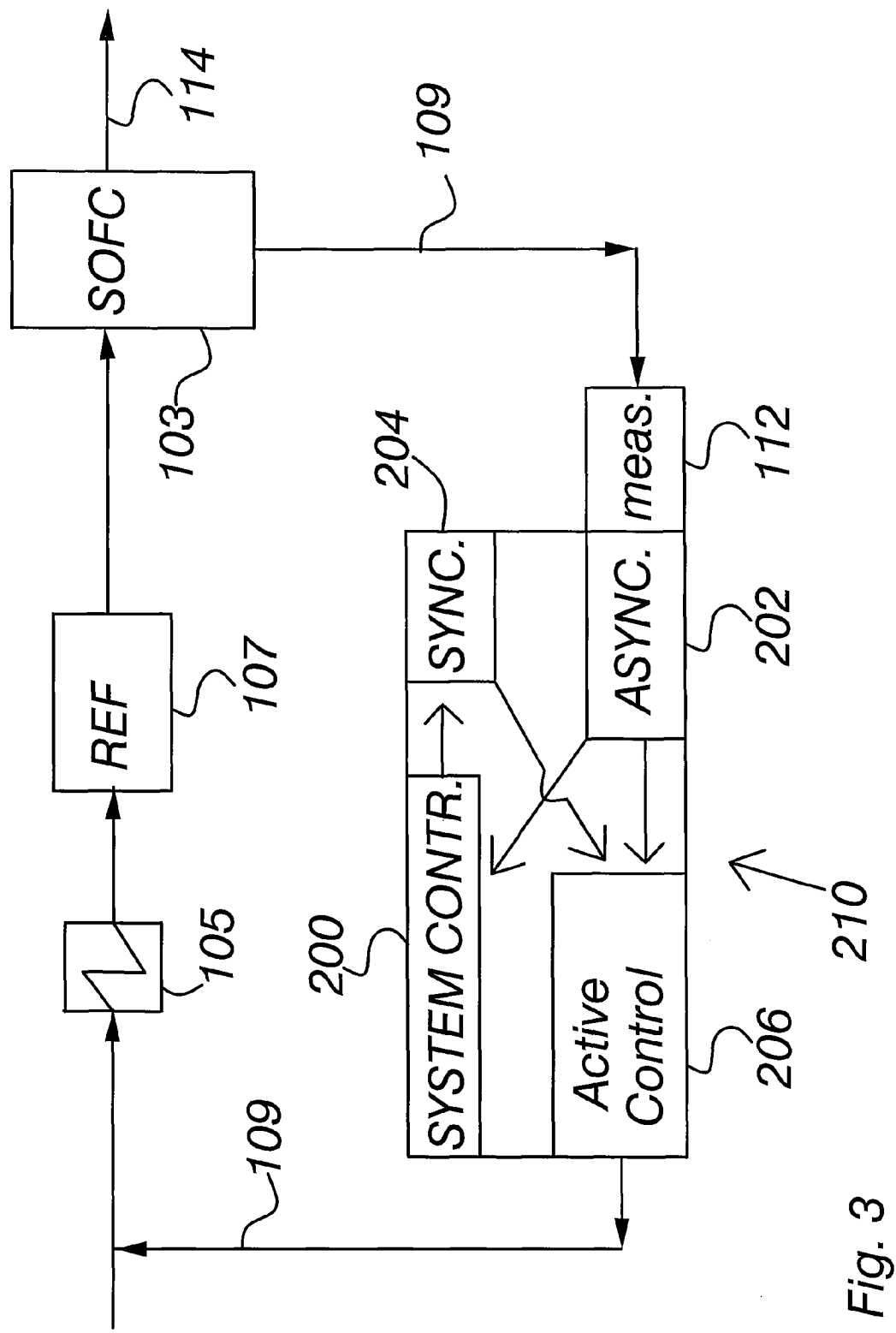
FIG. 3 shows an exemplary implementation of a control arrangement in a fuel cell device, according to an exemplary aspect.

Referring to FIG. 3, means 204 for performing a substantially synchronous process and means 202 for performing a substantially asynchronous process can be physically located in the same processor 210 as the system controller 200. That is, for example, each of means 204 for performing a substantially synchronous process and means 202 for performing a substantially asynchronous process can be a processor. The calculation and control processes performed by both said means (202, 204) and the system controller (200) in connection with the fuel cell system process can be carried out programmatically by means of a control computer 210, which is, for example, a programmable logic (PLC, Programmable Logic Controller) or other processor-based computer.

Figure 2:
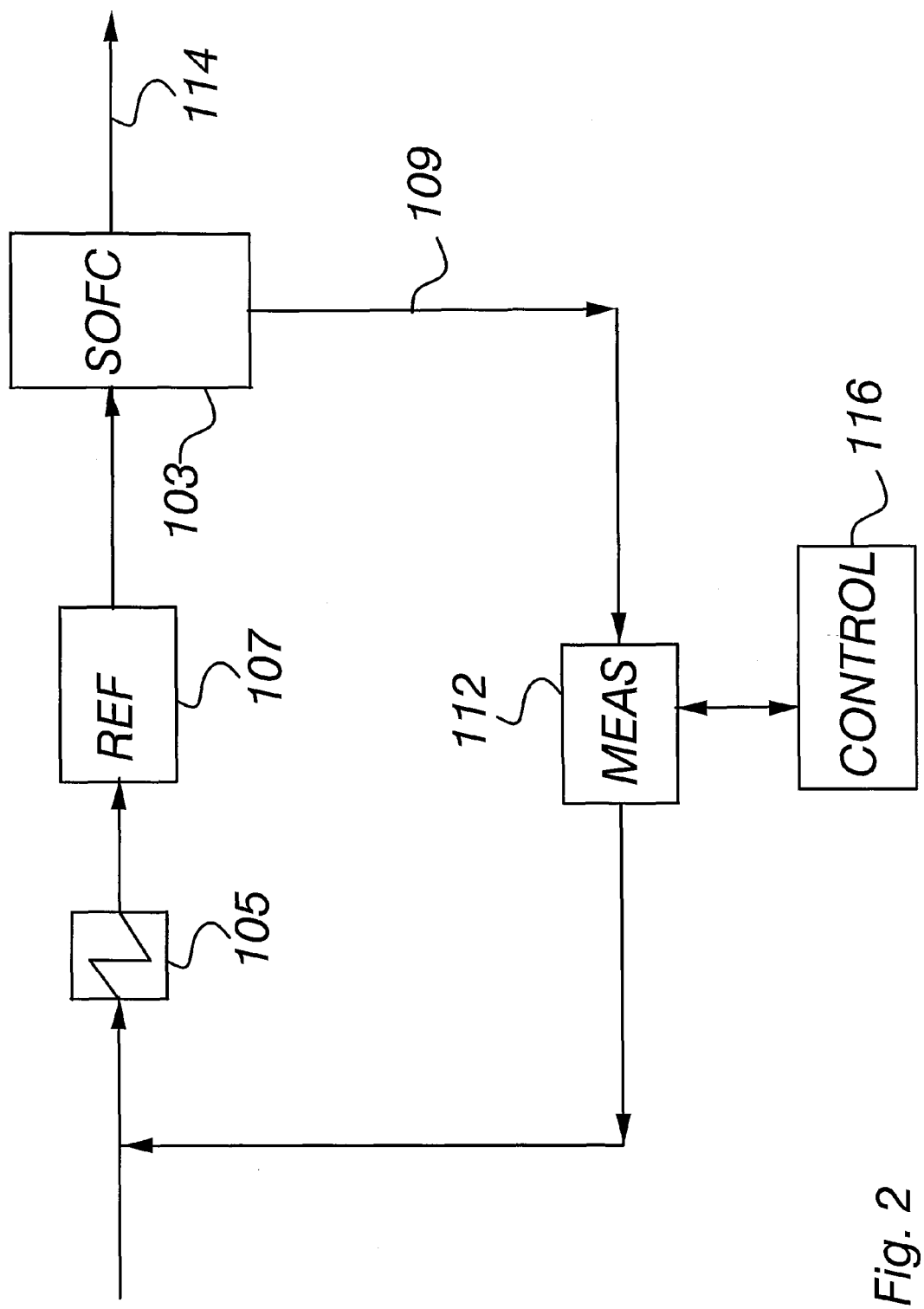
FIG. 2 presents an exemplary implementation of a feedback arrangement of a SOFC, according to an exemplary aspect.

FIG. 3 depicts an exemplary implementation of a control arrangement in a fuel cell system according to an exemplary embodiment. The fuel cell system in FIG. 3 is a SOFC (Solid Oxide Fuel Cell) device as presented above, for example, related to FIG. 2. The fuel cell system comprises, in a feedback arrangement, means 109 for recirculating fuel through the anode 100 sides of the fuel cells. The control arrangement in the fuel cell system comprises at least one system controller 200 in a control processor 210 for controlling the operation of the fuel cell system. For example, in the same control processor is located means 202 for performing a substantially asynchronous chemical reaction rates calculation process. For example, in said calculation process is utilized as input values fuel amount that is fed to the fuel cell system, input current values, leakage values and recirculation ratio values. Measurements can be made by measurements means 112, for example, to determine composition of recirculated gas. Gas composition can also be determined in a calculative process or in a process where both measurements and calculations are utilized in the determination of recirculated gas composition. For example, in said asynchronous calculation process is accomplished information on at least recirculation ratio on the basis of at least one of said gas composition and gas flow rate. This information can be accomplished in a substantially iterative process, and provided to the system controller 200.

An exemplary control arrangement presented in FIG. 3 comprises means 204 for generating, substantially synchronously with the system controller 200 process, fuel utilization (FU) information and Carbon formation information by utilizing the latest available recirculation ratio information provided from said asynchronous process, for example, via the system controller 200. By using said means 202, the asynchronous process can be performed substantially simultaneously with the synchronous process, in which is performed recalculations of at least FU information and Carbon formation information for each control cycle of the synchronous process based on the latest recirculation ratio information retrieved from the asynchronous process to the synchronous process in each control cycle of the synchronous process or more seldom.

The exemplary control arrangement presented in FIG. 3 further comprises means 206 for performing an active cyclic system control and system monitoring process by utilizing said FU information and Carbon formation information provided by said synchronous process. By using said means 202, the asynchronous process can be performed substantially simultaneously with the synchronous process so that maximum allowed execution interval of the active cyclic system control and system monitoring process is not exceeded. Said asynchronous process can be processed by utilizing in the iterative process an iterative algorithm suitable for cyclic execution so that a limited amount of iterative operations can be executed during a single control cycle of said synchronous process. For example, the asynchronous process can provide additional information to the synchronous process, not necessarily in every control cycle, but when said additional information, i.e., at least recirculation ratio information, is processed ready for the needs of the synchronous process. This kind of simultaneous asynchronous and synchronous processing can realize effective utilization of processor capacity.

In an exemplary embodiment, the control arrangement comprises said means 202, 204 for performing the synchronous and asynchronous processes simultaneously by accomplishing, in the asynchronous process and in some of the control cycles of the synchronous process, information on chemical reactions to intensify time utilization in the synchronous process. The arrangement can comprise said means 202 for performing the asynchronous process by accomplishing chemical reaction rates as said information on chemical reactions. Said chemical reaction rates can be based on, for example, a thermodynamic equilibrium model, and the disclosure can also be utilized based on kinetic model calculations.

In an exemplary embodiment, said means 202, 204, 206 are integrated to a same control processor, for example, even to the same control processor 210 with the system controller 200.

An exemplary embodiment can be utilized in many different kinds of applications in fuel cell devices comprising fuel circulation. For example, in an exemplary embodiment, means 202, 204, 206 may each locate in a separate processor and information communication can be arranged between the processors by wired or wireless communication means. The exemplary embodiment presented in FIG. 3 shows arrows, which are, as said, exemplary and related to the exemplary embodiment. The exemplary embodiment can be utilized in many kind of systems, where, for example, the synchronous process 204 receives directly information from the measurement means 112. The synchronous process 204 can also provide additional information to the asynchronous process 202. For example, there can be a direct information link from the asynchronous process 202 to the synchronous process 204, and not necessarily via the system controller 200 as shown in FIG. 3.

Although in the above description exemplary embodiments are described with reference to the figures, the disclosure is not limited to the description and figures and may be modified in any suitable manner.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A fuel cell system for producing electricity with fuel cells comprising a control arrangement, each fuel cell in the fuel cell system comprising an anode side, a cathode side and an electrolyte between the anode side and the cathode side, and the fuel cell system comprises means for recirculating fuel through the anode sides of the fuel cells, and the control arrangement comprises at least one system controller in a control processor for controlling the operation of the fuel cell system in control cycles of the system controller control process, wherein the control arrangement comprises a single computer programmed to:
   perform an asynchronous chemical reaction rates calculation process of at least one of fuel composition and fuel flow rate asynchronically with the control cycles of the system controller control process to generate information in an iterative process on at least recirculation ratio of the fuel recirculation through anodes, generate, in a synchronous process synchronically with the control cycles of the system controller control process, fuel utilization (FU) information and carbon formation information by utilizing the latest available recirculation ratio information provided by said asynchronous process, and
   perform an active cyclic system control and system monitoring process by utilizing said FU information and carbon formation information, wherein the asynchronous chemical reaction rates calculation process is adapted to process the asynchronous process simultaneously with the synchronous process so that said active cyclic system control and system monitoring process is processed below maximum allowed execution interval.

2. The fuel cell system as claimed in claim 1, wherein the computer is integrated to the same control processor with the system controller.

3. The fuel cell system as claimed in claim 1, wherein the computer is programmed to process the asynchronous process simultaneously with the synchronous process, in which is performed recalculations at least of fuel utilization (FU) information and carbon formation information by using the computer for generating fuel utilization (FU) information and carbon formation information, for each control cycle of the synchronous process based on the latest recirculation ratio information retrieved from the asynchronous process to the synchronous process in each control cycle of the synchronous process or more seldom.

4. The fuel cell system as claimed in claim 1, wherein the computer is programmed to perform the asynchronous process by utilizing in the iterative process an iterative algorithm suitable for cyclic execution so that a limited amount of operations is executed on a single control cycle of the synchronous process.

5. The fuel cell system as claimed in claim 1, wherein the computer is programmed to perform the synchronous and asynchronous processes simultaneously by determining, in the asynchronous process and in some of the control cycles of the synchronous process, information on chemical reactions to intensify time utilization in the synchronous process.

6. The fuel cell system as claimed in claim 5, wherein the computer is programmed to perform the asynchronous process by determining chemical reaction rates as said information on chemical reactions.

7. A control method for a fuel cell system for producing electricity with fuel cells, wherein the fuel cell system comprises a control arrangement, each fuel cell in the fuel cell system comprising an anode side, a cathode side and an electrolyle between the anode side and the cathode side, and the control arrangement comprises at least one system controller in a control processor for controlling the operation of the fuel cell system in control cycles of the system controller control process, wherein the control arrangement comprises a computer programmed to: perform an asynchronous chemical reaction rates calculation process of at least one of fuel composition and fuel flow rate asynchronically with the control cycles of the system controller control process to generate information in an iterative process on at least recirculation ratio of the fuel recirculation through anodes, generate, in a synchronous process synchronically with the control cycles of the system controller control process, fuel utilization (FU) information and carbon formation information by utilizing the latest available recirculation ratio information provided by said asynchronous process, and perform an active cyclic system control and system monitoring process by utilizing said FU information and carbon formation information, wherein the asynchronous chemical reaction rates calculation process is adapted to process the asynchronous process simultaneously with the synchronous process so that said active cyclic system control and system monitoring process is processed below maximum allowed execution interval; wherein the fuel is recirculated through the anode sides of the fuel cells, and operation of the fuel cell system is controlled in control cycles of a system control process, wherein the method comprises; processing the asynchronous chemical reaction rates calculation process of the at least one of fuel composition and fuel flow rate asynchronically with the control cycles of the system control process to generate the information in an iterative process on at least the recirculation ratio of the fuel recirculation through the anodes, generating the fuel utilization (FU) information and the carbon formation information in the synchronous process synchronically with the control cycles of the system control process by utilizing the latest available recirculation ratio information provided by said asynchronous process, performing the active cyclic system control and the system monitoring process by utilizing said FU information and said carbon formation information, wherein in the method, the performance of the asynchronous and the synchronous method steps and the performance of the active cyclic system control and system monitoring process are integrated to be performed in the control processor, and processing the asynchronous process simultaneously with the synchronous process so that said active cyclic system control and said system monitoring process is processed below maximum allowed execution interval.

8. The method as claimed in claim 7, wherein the performance of the asynchronous and synchronous method steps and the performance of the active cyclic system control and system monitoring process are integrated to be performed in the control processor with the system controller.

9. The method as claimed in claim 7, wherein the asynchronous process is processed simultaneously with the synchronous process, in which is performed recalculations of at least the fuel utilization (FU) information and the carbon formation information for each control cycle of the synchronous process based on the latest recirculation ratio information retrieved from the asynchronous process to the synchronous process in each control cycle of the synchronous process or more seldom.

10. The method as claimed in claim 7, wherein the asynchronous process is performed by utilizing in the iterative process an iterative algorithm suitable for cyclic execution so that a limited amount of operations is executed on a single control cycle of the synchronous process.

11. The method as claimed in claim 7, wherein the synchronous and asynchronous processes are performed simultaneously by determining, in the asynchronous process and in some of the control cycles of the synchronous process, information on chemical reactions to intensify time utilization in the synchronous process.

12. The method as claimed in claim 11, wherein in the asynchronous process is determined chemical reaction rates as said information on chemical reactions.

13. A fuel cell system for producing electricity with fuel cells comprising a control arrangement, each fuel cell in the fuel cell system comprising an anode side, a cathode side and an electrolyte between the anode side and the cathode side, and the fuel cell system comprises means for recirculating fuel through the anode sides of the fuel cells, and the control arrangement comprises at least one system controller in a control processor for controlling the operation of the fuel cell system in control cycles of the system controller control process, wherein the control arrangement comprises at least one computer programmed to:

perform an asynchronous chemical reaction rates calculation process of at least one of fuel composition and fuel flow rate asynchronically with the control cycles of the system controller control process to generate information in an iterative process on at least recirculation ratio of the fuel recirculation through anodes, generate, in a synchronous process synchronically with the control cycles of the system controller control process, fuel utilization (FU) information and carbon formation information by utilizing the latest available recirculation ratio information provided by said asynchronous process, and perform an active cyclic system control and system monitoring process by utilizing said FU information and carbon formation information, wherein the asynchronous chemical reaction rates calculation process is adapted to process the asynchronous process simultaneously with the synchronous process so that said active cyclic system control and system monitoring process is processed below maximum allowed execution interval.

14. The fuel cell system as claimed in claim 13, wherein the at least one computer is integrated to the same control processor with the system controller.

15. The fuel cell system as claimed in claim 1, wherein the at least one computer is programmed to process the asynchronous process simultaneously with the synchronous process, in which is performed recalculations at least of fuel utilization (FU) information and carbon formation information by using the at least one computer for generating fuel utilization (FU) information and carbon formation information, for each control cycle of the synchronous process based on the latest recirculation ratio information retrieved from the asynchronous process to the synchronous process in each control cycle of the synchronous process or more seldom.

16. The fuel cell system as claimed in claim 1, wherein the at least one computer is programmed to perform the asynchronous process by utilizing in the iterative process an iterative algorithm suitable for cyclic execution so that a limited amount of operations is executed on a single control cycle of the synchronous process.

17. The fuel cell system as claimed in claim 1, wherein the at least one computer is programmed to perform the synchronous and asynchronous processes simultaneously by determining, in the asynchronous process and in some of the control cycles of the synchronous process, information on chemical reactions to intensify time utilization in the synchronous process.

18. The fuel cell system as claimed in claim 17, wherein the at least one computer is programmed to perform the asynchronous process by determining chemical reaction rates as said information on chemical reactions.

19. A fuel cell system for producing electricity with fuel cells comprising a control arrangement, each fuel cell in the fuel cell system comprising an anode side, a cathode side and an electrolyte between the anode side and the cathode side, and the fuel cell system comprises means for recirculating fuel through the anode sides of the fuel cells, and the control arrangement comprises at least one system controller in a control processor for controlling the operation of the fuel cell system in control cycles of the system controller control process, wherein the control processor is programmed to:

perform an asynchronous chemical reaction rates calculation process of at least one of fuel composition and fuel flow rate asynchronically with the control cycles of the system controller control process to generate information in an iterative process on at least recirculation ratio of the fuel recirculation through anodes, generate, in a synchronous process synchronically with the control cycles of the system controller control process, fuel utilization (FU) information and carbon formation information by utilizing the latest available recirculation ratio information provided by said asynchronous process, and perform an active cyclic system control and system monitoring process by utilizing said FU information and carbon formation information, wherein the asynchronous chemical reaction rates calculation process is adapted to process the asynchronous process simultaneously with the synchronous process so that said active cyclic system control and system monitoring process is processed below maximum allowed execution interval.

20. The fuel cell system as claimed in claim 19, wherein the control processor is integrated with the system controller.

21. The fuel cell system as claimed in claim 19, wherein the control processor is programmed to process the asynchronous process simultaneously with the synchronous process, in which is performed recalculations at least of fuel utilization (FU) information and carbon formation information by using the control processor for generating fuel utilization (FU) information and carbon formation information, for each control cycle of the synchronous process based on the latest recirculation ratio information retrieved from the asynchronous process to the synchronous process in each control cycle of the synchronous process or more seldom.

22. The fuel cell system as claimed in claim 19, wherein the control processor is programmed to perform the asynchronous process by utilizing in the iterative process an iterative algorithm suitable for cyclic execution so that a limited amount of operations is executed on a single control cycle of the synchronous process.

23. The fuel cell system as claimed in claim 19, wherein the control processor is programmed to perform the synchronous and asynchronous processes simultaneously by determining, in the asynchronous process and in some of the control cycles of the synchronous process, information on chemical reactions to intensify time utilization in the synchronous process.

24. The fuel cell system as claimed in claim 23, wherein the control processor is programmed to perform the asynchronous process by determining chemical reaction rates as said information on chemical reactions.

\* \* \* \* \*